2,822,346

PHENOL-DICHLOROPHENOL FORMALDEHYDE CONDENSATION PRODUCTS

Edward C. Soule, deceased, late of Niagara Falls, N. Y., by Eleanore Benner Soule, executrix, Niagara Falls, N. Y., Leo S. Burnett, Niagara Falls, and George M. Wagner, Lewiston, N. Y., assignors to Olin Mathieson Chemical Corporation, a corporation of Virginia No Drawing. Application December 14, 1954
Serial No. 475,278

4 Claims. (Cl. 260—53)

This invention relates to novel resinous compositions comprising the aldehydric reaction products of phenolic components comprising defined proportions of phenol and a mixture of dichlorophenols containing defined proportions of the reactive 2,5- and 2,3-dichloro isomers. The new resins are obtained initially in the form of first stage Novolak or Resol type resins depending upon whether an acidic or basic catalyst is employed. These first stage resins can be cured by means of an aldehyde to infusible third stage resins having particularly desirable properties. The new resins are suitable for use in laminates, molding compositions, adhesive compositions, castings, surface coatings and similar applications.

Although it has been suggested that substituted phenols might be used in the preparation of phenolic resins, this proposal has not been put into practice to any great extent due to the fact that phenol is more reactive and more readily available than suitable substituted phenols.

Since phenols condense with aldehydes almost exclusively in the para and both ortho positions, all three of these positions should be unsubstituted to obtain high molecular weight highly cured resins. When one of the reactive positions carries a substituent the phenol will condense with an aldehyde to yield relatively high molecular weight second stage resins which can be cured to infusible third stage resins only by the addition of an extraneous crosslinking agent. When two of the reactive positions of a phenol are blocked by substituents the aldehydic condensation product is a low molecular weight resin which cannot be cured to an infusible third stage resin. Phenols having the para and both ortho positions blocked do not react with aldehydes to form resins.

The limited availability of substituted phenols suitable for condensation with aldehydes is largely due to the high reactivity of phenol. Commercially feasible methods of producing substituted phenols, for example, generally yield mixtures containing large proportions of phenolic isomers having substituents on the ortho and para positions. These unreactive substituted phenols are unsuitable for use in phenolic resins except as chain stoppers where it is desirable to control the degree of resinification. The production of mixed dichlorophenols by the chlorination of phenol is illustrative. The usual commercial processes yield a product which contains major proportions of 2,4-dichlorophenol, an effective chain stopper, and significant amounts of 2,6-dichlorophenol, which is no more reactive than the 2,4-isomer, and only minor proportions of the reactive 3,4- and 3,5-isomers.

It has been recognized in the art that it would be desirable to incorporate chlorine compounds into laminates prepared from phenolic resins in order to improve their fire retardant properties. Attempts to accomplish this result have generally been unsuccessful, possibly due to the fact that 2,4-dichlorophenol, the most commonly available dichlorophenol, is not sufficiently reactive to be incorporated in a phenolic resin in amounts sufficient to produce satisfactory fire retardant properties. The use of monochlorophenols, e. g., parachlorophenol, has also proved unsuccessful since twice as much monochlorophenol as dichlorophenol must be used to prepare a product having a given chlorine content. This approach is impractical due to the low reactivity of available monochlorophenols. In addition, it has been noted that a product having a given chlorine content supplied by a monochlorophenol often burns readily while a product having the same chlorine content supplied by a dichlorophenol is often self-extinguishing. For example, a laminate prepared from 50% by weight of paper and 50% by weight of a resin prepared from a phenolic mixture containing phenol and 25 mole percent of dichlorophenols (75% 2,5-dichlorophenol) and 0.8 mole of formaldehyde per mole of phenolic mixture, when ignited was self-extinguishing in 19 seconds. In comparison a molded article, prepared from a phenolic mixture containing phenol and 50 mole percent of p-chlorophenol, filled with 50 percent by weight of wood flour, containing the same percent of chlorine and cellulosic filler as the dichlorophenol laminate burned completely when ignited.

The present invention provides phenolic resins suitable for a wide variety of purposes which contain significant proportions of dichlorophenols and have excellent fire retardant properties. The new resins are formed by condensing an aldehyde with a phenolic component comprising from about 15 to about 90 mole percent of phenol and about 85 to about 10 mole percent of mixed dichlorophenols. The mixed dichlorophenols comprise from about 50 to about 85 mole percent of 2,5-dichlorophenol and from about 10 to about 15 mole percent of 2,3-dichlorophenol; any remainder of the mixture consisting principally of 2,4- and 2,6-dichlorophenols with or without minor proportions of other isomeric dichlorophenols and trichlorophenols. The resins are formed by heating the reaction mixture in the presence of a small amount of an acidic or basic catalyst for a period of time ranging from about 20 to 60 minutes depending, among other factors, on the ratio of phenol to dichlorophenol in the phenolic component. Since dichlorophenols are less reactive than phenol, reaction times of about an hour are necessary when the phenolic component contains 85 mole percent of dichlorophenols while shorter reaction times, e. g., 20 minutes, suffice when only 25 mole percent of dichlorophenols are present. When an acid catalyst is employed it is neutralized by the addition of lime after completion of the reaction. The aqueous layer is separated from the reaction mixture and the resin is dehydrated under vacuum at temperatures up to about 120° C. The first stage Novolak or Resole resins produced in this manner are stable on storage and can be converted to infusible third stage laminating resins as described below.

Suitable aldehydes for use in the present invention include formaldehyde and furfuraldehyde as well as other aldehydes commonly employed in the preparation of phenolic resins. Formaldehyde is preferred and can be employed in any of its various forms such as 40% formalin or paraformaldehyde or in the form of formaldehyde-generating substances such as hexamethylenetetramine.

Mixed dichlorophenols suitable for use in the preparation of the new resins can be readily obtained by a two step process which comprises dehydrochlorinating waste benzene hexachloride isomers and hydrolyzing the resulting trichlorobenzenes to dichlorophenols as described in detail in copending application, Serial No. 389,163. filed October 10, 1953, of Nicolaisen and Jenney.

Conventional phenol-formaldehyde laminating resins are prepared by heating the reaction mixture, usually under reflux conditions, for 30 to 60 minutes in the presence of an alkaline catalyst such as aqueous caustic soda, ammonia, trimethylamine or other alkaline reacting material, separating the aqueous phase, and dehydrating the product under vacuum. A formaldehyde to phenol ratio of 1.1 to 1.5:1 is usually employed. In the present invention the same procedure can be employed but the ratio of aldehyde to phenolic component is preferably from 0.8 to 0.9:1 for the acid catalyzed resins and 1.5 to 2.5:1 for the basic catalyzed resins.

Suitable acid catalysts include 37% aqueous hydrochloric acid, which is effective when used in an amount of about 0.5% by weight based on the total weight of the aldehyde and phenolic component, and formic and acetic acids which are effective in concentrations of about 1 to 4% by weight. Preferred basic catalysts include triethylamine and ammonia which are effective in amounts of about 1% by weight, and which may be added in the form of aqueous solutions. Other conventional acidic and basic catalysts used to prepare phenolic resins can also be employed in the present invention. The acid catalyzed resins are normally low in acetone extractables and, therefore, are particularly useful in applications where this property is important. The basic catalyzed resins on the other hand, are normally higher in acetone extractables but are preferred for certain uses, e. g., electrical applications, where higher amounts of acetone extractables can be tolerated and other properties possessed by the basic reasons are desirable.

In the manufacture of laminates the first stage resins are dissolved in a suitable solvent, for example, acetone, ethanol, toluene and the like or mixtures of these solvents. With the acid catalyzed resins about 10% by weight, based on the resin, of hexamethylenetetramine is added. Layers of fabric, paper or other base material are impregnated with the resin solution, dried and stacked. The pile of laminae is then shaped and cured by heating at about 280° F. under pressures of 500 to 1000 p. s. i. or more for 10 to 40 minutes.

The resins of the present invention have an advantage over resins prepared solely from phenol in that they are less viscous and therefore more readily incorporated into the material to be laminated. They also cure under milder conditions and in a shorter time producing laminates having very low amounts of acetone-extractable components. Laminates prepared from the new resins are outstanding in hardness, possess excellent mechanical properties and when ignited are self-extinguishing without punking.

The preparation of the first stage resins of this invention and the use of these resins in the preparation of laminates and the like will be illustrated by the following examples which are not to be construed as limiting the scope of the invention.

*Example I*

The mixture of dichlorophenols used in this preparation contained the following components:

| Component: | Percent by weight |
|---|---|
| 2,5-dichlorophenol | 66 |
| 2,3-dichlorophenol | 14 |
| 2,6-dichlorophenol | 12 |
| Other dichlorophenol isomers | 2 |
| Trichlorophenols | 6 |
| | 100 |

The resin was prepared by heating a mixture of 163 parts by weight (1 mole) of the dichlorophenol mixture, 94 parts by weight (1 mole) of phenol, 130 parts by weight (1.60 moles) of 40% formalin and 2.5 parts by weight of 37% hydrochloric acid for 20 minutes at 80° C. The resulting Novolak type resin was neutralized by the addition of an amount of lime sufficient to combine with the hydrochloric acid. After decanting the upper aqueous phase, the resin was dehydrated by heating to a maximum temperature of 90° C. for about one hour under a pressure gradually reduced to about 20 mm.

The resulting first stage resin was dissolved in an equal weight of a mixture of 90% by volume of ethanol and 10% by volume of toluene. About 13 parts of hexamethylene-tetramine per 100 parts of resin and 2 parts of stearic acid were incorporated into the solution. A weight of paper equal to that of the resin was impregnated with the solution. The sheets were air-dried, piled and placed in a cold press. The sheets were then cured for 30 minutes at 280° F. under pressure of 500 p .s. i. The platens were cooled to 100° F. and the laminate was removed.

The resulting laminate had a specific gravity of 1.44 and contained only about 2% of acetone-extractable material. The Rockwell M hardness was 91 compared with 84 for a similarly prepared laminate using phenol as the phenolic component. The laminate prepared according to this invention had a tensile strength of 11,100 p. s. i. and a flexural strength of 31,000 p. s. i. as compared to a tensile strength of 17,800 p. s. i. and a flexural strength of 20,000 p. s. i. for the laminate prepared solely from phenol. The dichlorophenol laminate was self-extinguishing in less than 4 seconds while the phenol laminate burned completely. No punking was observed after the dichlorophenol laminate was extinguished whereas the phenol laminate glowed for several minutes.

The procedure described above was repeated using a phenolic component containing a mixed dichlorophenol to phenol molar ratio of 25:75 to produce a laminate containing 7.5% of chlorine and only 2.5% of acetone extractables. A similar laminate having a phenolic component in which the mixed dichlorophenol to phenol ratio was 85:15 was prepared by extending the reaction time to 1 hour at 80° C. This laminate possessed desirable fire retardant properties and only about 15% of acetone extractables.

*Example II*

A laminating resin was prepared by heating a mixture of 82 parts by weight (0.50 mole) of the dichlorophenol mixture described in Example I, 47 parts by weight (0.50 mole) of phenol, 88 parts by weight (1.10 moles) of 40% formalin and 12 parts by weight of 28% aqueous ammonia for thirty minutes. The upper aqueous phase was decanted and the resin was dehydrated by heating for one hour while gradually reducing the pressure to about 25 mm. while heating to a maximum temperature of about 80° C. The resulting Resole type resin was dissolved in an equal weight of a mixture of 90% by volume of ethanol and 10% by volume of toluene. Stearic acid, 2 parts by weight, was added to the resin solution. A weight of paper equal to that of the resin was impregnated with the solution. The sheets of paper were air-dried, piled and placed in a cold press. The laminae were then cured for thirty minutes at 280° F. under a pressure of 500 p. s. i. The platens were cooled to a 100° F. temperature and the laminate was removed from the press. The resulting laminate was self-extinguishing and non-punking.

A similar laminating resin prepared by the above procedure from a phenolic component having a phenol to mixed dichlorophenol ratio of 67:33 was self-extinguishing and non-punking.

*Example III*

The first stage (Novolak) resin of Example I was used in the preparation of a molding powder having the following composition:

| Component: | Parts by weight |
|---|---|
| Resin of Example I | 100 |
| Wood flour filler | 110 |
| Stearic acid | 2 |
| Lime | 2 |
| Dye | 2 |
| Furfural | 5 |
| Hexamethylenetetramine | 13 |

The resulting powder was molded for 5 minutes at 350° F. under a pressure of 1000 p. s. i. and cooled to produce an article containing 9.7% of chlorine having water absorption of 0.14%, specific gravity of 1.41, acetone extractables of 5.6%, Rockwell M hardness of 120 and tensile strength of 4600 p. s. i. The article was self-extinguishing in 2 seconds, showed no punking, and showed no change in heat resistance when heated to 340° F. for 3 hours.

*Example IV*

A mixture of 0.65 mole of phenol, 0.35 mole of the mixed dichlorophenols of Example I, 0.80 mole of formaldehyde (added as 40% formalin) and 1.0 ml. of 37% aqueous hydrochloric acid as refluxed for 25 minutes. The reaction mixture was neutralized by the addition of lime with stirring. The aqueous phase was decanted and the resin dehydrated by heating to a maximum temperature of 80° C. for 30 minutes at a pressure of 30 mm. The resulting resin was a syrupy liquid or glass depending on the exact time of heating.

*Example V*

A molding powder was prepared from 100 parts by weight of the resin of Example IV, 110 parts of wood flour, 2 parts of stearic acid and 13 parts of hexamethylenetetramine. The resin was still fluid after milling on rubber rolls for 5 to 10 minutes with the temperature of the front roll at 70° C. and the back roll unheated but was brittle when cooled to room temperature. The resin was ground to 80 mesh and a charge of this material was introduced to a mold and cured for 2 minutes at 320° F. The product had a Rockwell M hardness of 125 and 3 to 5 percent of acetone extractables.

*Example VI*

A rubber filled composition was prepared by compounding on a rubber mill 70 parts by weight of Buna-N (co-polymerized butadiene-acrylonitrile) synthetic rubber, 30 parts of the first stage resin of Example I, 100 parts of wood flour, 2 parts of stearic acid, 2 parts of hydrated lime, 2 parts of zinc oxide, 0.5 part of sulfur, 0.5 part of benzothiazyl disulfide and 18 parts of hexamethylenetetramine. This composition was cured in a mold at 310 to 320° F. at 1000 p. s. i. for 35 minutes. The product had a Rockwell M hardness of 64 and 7.5% of acetone extractables. The product was self-extinguishing only after 57 seconds but a similar product prepared from unchlorinated phenol burned completely.

*Example VII*

A casting resin was prepared by heating a mixture of 0.80 mole of phenol, 0.20 mole of the mixed dichlorophenols used in Example I, 2.50 moles of formalin and 0.125 mole of caustic soda to 80° C. for 3 hours. The resulting resin, water soluble at this stage, was neutralized with 0.09 mole of lactic acid. The resin was dehydrated at 80° C. for 1 hour at a pressure of 30 mm. The resin was cast in open molds maintained at 85 to 90° C. for 2 to 3 days to produce a product having a Rockwell M hardness of 90 to 95.

*Example VIII*

A mixture of 0.5 mole of the mixed dichlorophenols of Example I, 0.5 mole of phenol, 1.0 mole of formaldehyde (as 37% formalin), 0.10 mole of glyoxal and 7.0 grams of 28% aqueous ammonia was heated to reflux for 35 minutes. The aqueous layer was decanted and the resin dehydrated at 80° C. for 1.5 hours at a pressure of 15 to 20 mm. A laminate prepared as in Example II had acetone extractables of only 20%.

*Example IX*

A mixture of 0.25 mole of the mixed dichlorophenols of Example I, 0.75 mole of phenol and 0.70 mole of formalin was heated to 60° C., 1 ml. of 37% aqueous hydrochloric acid was added and the mixture was held at 60° C. for 10 minutes. Caustic soda (5 grams of 50% aqueous NaOH), and 1.8 moles of formalin were added and the heating was continued for 1 hour at 80° C. The resin was dehydrated at 80° C. at 25 mm. pressure. Caustic soda (4 grams of 50% aqueous NaOH) was added to increase the water tolerance of the resin. The product contained 77% solids which contained 13% chlorine. The pH was 7.8 and the water tolerance was 500% (grams of water per gram of resin which may be added to first appearance of turbidity multiplied by 100). This resin is useful as a binder for insulating materials, e. g., glass wool, rock wool, and the like. A water solution or emulsion of the resin is sprayed onto the wool and the resin cured by heating. Curing time is 90 seconds at 150° C. The binder is non-inflammable and shows no punking.

The excellent properties of the laminates prepared from the resins of the present invention are due to the defined proportions of the phenolic component. The mixed dichlorophenols used in the present invention are not sufficiently reactive to be condensed with aldehydes to form suitable resins. In the present invention phenol is used to adjust the concentration of the less reactive dichlorophenols in the phenolic component, thus providing a phenolic component which reacts completely to form resins of suitable chain length for the production of laminates having outstanding flame resistance and very low amounts of acetone extractible material. The amounts of dicholorophenol chain stoppers in the phenolic component are such as to cause the formation of first stage resins having lower viscosities than comparable resins produced from phenols alone. The lower viscosity of these resins is a valuable property since it makes them easier to incorporate into the material to be laminated. The upper and lower limits of the proportions of dichlorophenols in the phenolic component are also important. The use of proportions of dichlorophenols greater than 85 mole percent in the phenolic component results in resins which do not cure well and which contain excessive amounts of acetone extractible components. The use of proportions of dichlorophenols less than about 10 mole percent in the phenolic component results in laminates which do not possess the desired flame resistance.

We claim:

1. A resinous composition comprising the condensation product of formaldehyde with a phenolic component consisting essentially of about 15 to about 90 mole percent of phenol and about 85 to about 10 mole percent of mixed dichlorophenols, the mixed dichlorophenols comprising about 50 to about 85 mole percent of 2,5-dichlorophenol and about 10 to about 15 mole percent of 2,3-dichlorophenol.

2. A resinous composition comprising the formaldehyde condensation product of a phenolic component consisting essentially of about 50 mole percent of phenol and about 50 mole percent of mixed dichlorophenols, the mixed dichlorophenols comprising about 65 mole percent of 2,5-dichlorophenol and about 15 mole percent of 2,3-dichlorophenol.

3. An acid catalyzed composition according to claim 1 in which the ratio of aldehyde to phenolic component is within the range from 0.8 to 0.9:1.

4. A basic catalyzed composition according to claim 1 in which the ratio of aldehyde to phenolic component is within the range from 1.5 to 2.5:1.

References Cited in the file of this patent

UNITED STATES PATENTS 1,215,072     Steinmetz _____ Feb. 6, 1917

FOREIGN PATENTS 330,894     Great Britain _____ June 16, 1930